United States Patent [19]

Köhler et al.

[11] Patent Number: 5,618,890
[45] Date of Patent: Apr. 8, 1997

[54] ALLYLPHENOL-TERMINATED POLYCARBONATES GRAFTED WITH MALEIC ANHYDRIDE, THEIR USE FOR THE PRODUCTION OF BLENDS WITH POLYAMIDE AND THE CORRESPONDING BLENDS

[75] Inventors: Burkhard Köhler, Krefeld; Klaus Horn, Dormagen, both of Germany

[73] Assignee: Bayer Aktiengesellschaft, Leverkusen, Germany

[21] Appl. No.: 516,376

[22] Filed: Aug. 17, 1995

[30] Foreign Application Priority Data

Aug. 24, 1994 [DE] Germany ............... 44 29 979.6

[51] Int. Cl.$^6$ .................. C08F 283/02; C08F 283/04; C08L 69/00; C08G 64/00
[52] U.S. Cl. .................. 525/468; 525/426; 525/433; 528/196; 528/198; 528/204; 528/207; 264/176.1; 264/211.24; 264/219
[58] Field of Search .................. 528/196, 198, 528/204, 207; 525/468, 433, 426; 264/176.1, 211.24, 219

[56] References Cited

U.S. PATENT DOCUMENTS 4,888,401  12/1989  Kawaki et al. ............ 525/468
5,426,159  6/1995  Umemura ................. 525/468

FOREIGN PATENT DOCUMENTS 0009747  4/1980  European Pat. Off. .
0270809  6/1986  European Pat. Off. .
0293908  12/1988  European Pat. Off. .
0520506  12/1992  European Pat. Off. .

OTHER PUBLICATIONS

Derwent Database, JP 02 006 514 (Jan. 10, 1990).

*Primary Examiner*—Terressa M. Mosley
*Attorney, Agent, or Firm*—Connolly & Hutz

[57] ABSTRACT

The invention relates to polycarbonates (PC) terminated by allylphenols, preferably eugenol, and subsequently grafted with maleic anhydride (MA) in the melt, to their use as blending partners for polyamides (PA) and to the polycarbonate/polyamide blends.

8 Claims, No Drawings

ALLYLPHENOL-TERMINATED POLYCARBONATES GRAFTED WITH MALEIC ANHYDRIDE, THEIR USE FOR THE PRODUCTION OF BLENDS WITH POLYAMIDE AND THE CORRESPONDING BLENDS

This invention relates to polycarbonates (PC) terminated by allylphenols, preferably eugenol, and subsequently grafted with maleic anhydride (MA) in the melt, to their use as blending partners for polyamides (PA) and to the polycarbonate/polyamide blends.

Eugenol-terminated polycarbonates grafted with vinyl monomers are known from EP-A 520 506. Grafting products with maleic anhydride are not described.

Anhydride-terminated polycarbonates are described in EP-A 270 809. They are used as blending partners for polyamide. The blends obtained show inadequate breaking elongation for certain applications. In addition, the PC component is soluble in methylene chloride.

The problem addressed by the present invention was to provide new allylphenol-terminated aromatic polycarbonates grafted with maleic anhydride which could be blended with polyamide to form blends having high breaking elongation coupled with high resistance to solvents.

Accordingly, the present invention relates to allylphenol-terminated aromatic polycarbonates grafted with maleic anhydride. The polycarbonates are preferably grafted with 0.2 to 5% by weight and more preferably with 1 to 3% by weight (based on 100% by weight of polycarbonate) of maleic anhydride.

Preferred aromatic polycarbonates are those which have been polymerized using 1.5 to 8.5 mole-% and preferably 2 to 6 mole-% of allylphenols are chain terminators (based on the moles of diphenols used) and which are grafted with 0.2 to 5% by weight and preferably with 1 to 3% by weight of maleic anhydride.

The allylphenol-terminated polycarbonate component is both a homopolycarbonate and a copolycarbonate. Polycarbonate mixtures both of homopolycarbonates and of copolycarbonates and also mixtures thereof are suitable.

The allylphenol-terminated polycarbonates generally have weight average molecular weights $\overline{M}_w$ (as determined, for example, in known manner via the relative solution viscosity or by gel chromatography after preliminary calibration) in the range from 10,000 to 200,000 and preferably in the range from 20,000 to 80,000.

The allylphenol-terminated polycarbonates are those based on diphenols corresponding to formula (I):

HO—D—OH       (I)

in which D is a two-bonded $C_{6-50}$ and, more particularly, $C_{12-45}$ aromatic radical which may contain hetero atoms or C-containing hetero segments that do not fall under the 6 to 50 carbon atoms.

Accordingly, the allylphenol-terminated polycarbonates have bifunctional structural units corresponding to formula (II):

in which D is as defined above.

Suitable diphenols of formula (I) are, for example, those corresponding to formula (Ia):

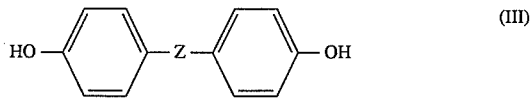

in which Z is a single bond, a $C_{1-8}$ alkylene radical, a $C_{2-12}$ alkylidene radical, a cyclohexylidene radical, a benzylidene radical, a methyl benzylidene radical, a bis-(phenyl)-methylene radical, —S—, —SO$_2$—, —CO— or —O—.

Other suitable diphenols of formula (I) are, for example, those corresponding to formula (Ib):

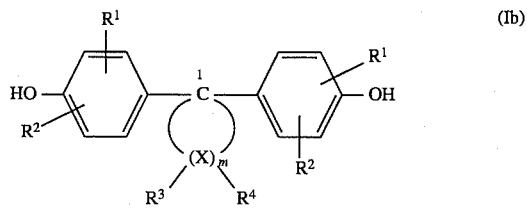

in which $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$-alkyl, more particularly benzyl, m is an integer of 4 to 7, preferably 4 or 5, $R^3$ and $R^4$ may be individually selected for each X and, independently of one another, represent hydrogen or $C_{1-6}$ alkyl and X is carbon, with the proviso that, at at least one atom X, $R^3$ and $R^4$ are both alkyl.

These diphenols and polycarbonates thereof are described in DE-OS 3 832 396.

Examples of diphenols corresponding to formula (I) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides and α,α'-bis-(hydroxyphenyl)-diisopropyl benzenes.

These and other suitable diphenols corresponding to formula (I) are described, for example, in U.S. Pat. Nos. 3,028,365, 2,999,835, 3,148,172, 3,275,601, 2,991,273, 3,271,367, 3,062,781, 2,970,131 and 2,999,846, in DE-OSS 1 570 703, 2 063 050, 2 063 052, 2 211 0956, 3 832 396, in FR-PS 1 561 518 and in the book by H. Schnell entitled "Chemistry and Physics of Polycarbonates" Interscience Publishers, New York, 1964.

Preferred diphenols of formula (I) are, for example, 4,4'-dihydroxydiphenyl, 2,2-bis-(4-hydroxyphenyl)-propane, 2,4-bis-(4-hydroxyphenyl)-2-methyl butane, 1,1-bis(4-hydroxyphenyl)-cyclohexane, α,α'-bis-(4-hydroxyphenyl)-p-diisopropyl benzene and 1,1-bis-(4-hydroxyphenyl)-3,3,5-trimethyl cyclohexane.

Particularly preferred diphenols of formula (I) are, for example, 2,2-bis-(4-hydroxyphenyl)-propane, 1,1-bis-(4-hydroxyphenyl)-cyclohexane and 1,1-bis-(4-hydroxyphenyl)-3,3,5-trimethyl cyclohexane.

2,2-Bis-(4-hydroxyphenyl)-propane and 1,1-bis-(4-hydroxyphenyl)-3,3,5-trimethyl cyclohexane are most particularly preferred.

The diphenols corresponding to formula (I) may be used both individually and in admixture.

In addition, the polycarbonates may be branched in known manner (see, for example, DE-PS 2 500 092 and U.S. Pat. No. 4,185,009) by the incorporation of small quantities, preferably from 0.05 to 2 mole-%, based on diphenols used, of trifunctional or more than trifunctional compounds, for example those containing three or more than three OH groups.

Some of the compounds used containing three or more than three phenolic hydroxy groups are, for example, Phloroglucinol, 4,6-dimethyl-2,4,6-tri-(4-hydroxyphenyl)-heptane, 1,3,5-tri-(4-hydroxyphenol)-benzene, 1,1,1-tri(4-hydroxyphenyl)-ethane, 2,6-bis-(2'-hydroxy-5'-methylbenzyl)-4-methyl phenyl, 2-(4-hydroxyphenyl)-2-(2,4-dihydroxyphenyl)-propane and 1,4-bis-(4,4'-dihydroxytriphenyl methyl)-benzene. Some of the other trifunctional compounds are 2,4-dihydroxybenzoic acid, trimesic acid, cyanuric chloride and 3,3-bis-(4-hydroxy-3-methylphenyl)-2-oxo-2,3-dihydroindole.

The production of the polycarbonates, for example from diphenols corresponding to formula a) 1), is known from the literature or may be carried out by methods known from the literature (see, for example, H. Schnell, Chemistry and Physics of Polycarbonates, Interscience Publishers, New York, 1964 or U.S. Pat. No. 3,028,365 and 3,275,601).

Suitable chain terminators for regulating molecular weight and for introducing the allyl groups are allylphenols corresponding to formula (II):

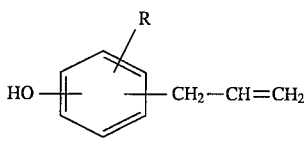

in which R is hydrogen, $C_{1-22}$ alkyl, $C_{6-12}$ cycloalkyl, $C_{6-14}$ aryl or $C_{1-18}$ alkoxy, preferably methoxy or hydrogen, and isoeugenol and allyl naphthol. Particularly preferred allylphenols are 2-allylphenol, 4-allylphenol, eugenol and isoeugenol, eugenol being most particularly preferred.

The allylphenol-terminated, maleic anhydride-grafted polycarbonates may be produced by the process described in EP-A 520 506.

In addition, they may also be produced by mixing allylphenol-terminated polycarbonates and 0.2 to 5% by weight (based on 100% by weight of polycarbonate) of maleic anhydride in the melt at temperatures of 220° to 360° C. either in kneaders or in extruders. This process is also the subject of the present invention.

The present invention also relates to the use of the polycarbonates according to the invention for the production of polyamide blends.

The present invention also relates to thermoplastic molding compounds containing A) 40 to 95% by weight and preferably 60 to 90% by weight of allylphenol-terminated, maleic anhydride grafted polycarbonates, B) 5 to 60% by weight and preferably 10 to 40% by weight of polyamides and c) 0 to 20% by weight of epoxy- or anhydride- and/or acid-functional rubbers, the sum of A)+B)+C) being 100.

The polyamide component B) is either a homopolyamide or a copolyamide. Mixtures of the polyamides may also be used.

Polyamides suitable for use in accordance with the invention are known per se and include, for example, polyamides having molecular weights of 5,000 or higher as described, for example, in U.S. Pat. Nos. 2,071,250, 2,071,251, 2,130,523, 2,130,948, 2,241,322, 2,312,966, 2,512,906 and 3,393,210.

The polyamides may be produced, for example, by condensation of equimolar quantities of a saturated or aromatic $C_{4-12}$ dicarboxylic acid with a $C_{4-14}$ diamine or by condensation of -aminocarboxylic acids or by polyaddition of lactams. Examples of polyamides are polyhexamethylene adipic acid amide (nylon 66), polyhexamethylene azelaic acid amide (nylon 69), polyhexamethylene sebacic acid amide (nylon 610), polyhexamethylene dodecanedioic acid amide (nylon 612), the polyamides obtained by ring opening of lactam, such as polycaprolactam, polylauric acid lactam, also poly-11-aminoundecanoic acid and di-(p-aminocyclohexyl)-methane dodecanedioic acid amide. It is also possible in accordance with the invention to use polyamides which have been produced by copolycondensation of two or more of the above-mentioned polymers or components thereof, for example a copolymer of adipic acid, isophthalic acid and hexamethylenediamine. The polyamides are preferably linear and have melting points above 200° C. for a glass transition temperature below 60° C. or, in the case of amorphous polyamides, a glass transition temperature of 80° to 200° C.

Preferred polyamides are polyhexamethylene adipic acid amide, polyhexamethylene sebacic acid amide and polycaprolactam. The polyamides generally have a relative viscosity of 2.5 to 5, as measured on a 1% solution in m-cresol at 25° C., which corresponds to a molecular weight $\overline{M}_w$ of around 15,000 to 45,000.

The rubbers used in accordance with the invention for component C) are terpolymers of 1. 55% by weight to 85% by weight of ethylene, propylene, butadiene or isoprene with 2. 5% by weight to 40% by weight of alkene carboxylic acids or esters thereof and with 3. 1% by weight to 17% by weight of maleic anhydride or of 1. 55% by weight to 85% by weight of ethylene, propylene, butadiene or isoprene with 2. 5% by weight to 40% by weight of alkene carboxylic acids or esters thereof and with 3. 1% by weight to 17% by weight of epoxy-functional monomers, preferably glycidyl methacrylate and/or glycidyl acrylate and/or allyl glycidyl ether.

Suitable alkene carboxylic acids are any of those compounds which may be polymerized with the olefins mentioned above, preferably $C_{3-6}$ alkene carboxylic acids. Examples include acrylic acid, methacrylic acid, itaconic acid, aconitic acid and/or fumaric acid. Acrylic acid and/or methacrylic acid are particularly preferred.

Suitable alkene carboxylic acid esters are esters of the above-mentioned alkene carboxylic acids with $C_{1-8}$ alcohols. Esters of acrylic acid with $C_{1-8}$ alcohols are particularly suitable. Esters of acrylic acid with methanol, ethanol or 1-butanol are most particularly preferred. However, mixtures of various $C_{1-8}$ alkyl esters of $C_{3-6}$ alkene carboxylic acids may also be used.

The maleic anhydride may either be added during the synthesis of the rubbers as polymer-forming component or may be polymerized by a standard grafting reaction onto a preformed rubber graft base.

The rubbers of component C) may be produced by any known polymerization processes (emulsion, solution, bulk, suspension, precipitation polymerization) and by combinations of these processes.

In the production of the anhydride-functional rubbers by grafting, the monomer to be grafted on is polymerized in the presence of the preformed graft base. Besides the actual graft polymer, free homopolymer is also formed. Accordingly, the graft products are understood to be the sum total of the actual graft copolymers and the free polymers. The quantity of monomer grafted on and the molecular weight of the homopolymer may be influenced within wide limits by variation of the polymerization conditions, including above all the particular polymerization process, the temperature, the activator system, the molecular weight regulator, the stirring conditions and the way in which the monomer is added.

The rubbers to be used in accordance with the invention should be largely uncrosslinked, i.e. at least 90% of the rubbers should be soluble in hot solvents, such as for example toluene, ethyl benzene or tetrachloroethylene. The rubbers have melting points of 20 to 160° C. and preferably 40° to 100° C. The melting points were determined by the DSC (differential scanning calorimeter) method.

The blends according to the invention of components A), B) and C) are produced by melt-compounding of dried polyamide with the rubber of component C). After drying, the blend is melt-compounded with the polycarbonate.

Standard twin-screw extruders, preferably of the degassing type, may be used for this method of producing the blends according to the invention.

The melt compounding both in the first stage and the second stage is carried out at 250° to 320° C. and preferably at 270° to 300° C.

Accordingly, the present invention also relates to a process for the production of the blends according to the invention of components A), B) and C), characterized in that, in the first stage, dried polyamide within the quantity range according to the invention is melt-compounded with the rubber of component C) within the quantity range according to the invention at temperatures of 250° C. to 320° C. and preferably at temperatures of 270° C. to 300° C., the mixture obtained is dried and, in the second stage, is melt-compounded with the polycarbonate according to the invention, again at temperatures of 250° C. to 320° C. and preferably at temperatures of 270° C. to 300° C. and the mixture obtained is subsequently cooled and granulated in known manner.

The additives known for components A), B) and C) may be incorporated in the blends according to the invention in known quantities before or during or after the production of the blends according to the invention in the usual quantities for components A), B) or C).

Suitable additives are plasticizers, flow agents, stabilizers against UV light, heat, moisture and against oxygen, pigments and flameproofing agents.

Accordingly, the present invention also relates to blends consisting of components A), B) and C) according to the invention and at least one additive selected from plasticizers, flow agents, stabilizers, pigments and flameproofing agents.

The present invention also relates to a process for the production of the blends according to the invention consisting of components A), B) and C) according to the invention and at least one additive selected from plasticizers, flow agents, stabilizers, pigments and flameproofing agents, characterized in that at least one of the additives mentioned is incorporated in known manner before or during or after the production of the blends of components A), B) and C) according to the invention in the usual quantities for components A), B) or C).

The blends according to the invention may be processed in known manner to molded articles or semifinished products, for example by extrusion or injection molding.

The molded articles are used as housings for electrical or electronic equipment or in the automotive field.

EXAMPLES

Example 1

Production of a eugenol-terminated polycarbonate 8 kg of 45% NaOH, 40 l of water, 4,560 g of bisphenol A, 105 g of eugenol (3.5 mole-%), 13.2 kg of chlorobenzene and 37.2 kg of methylene chloride are initially introduced, phosgenated by introduction of 3 kg of phosgene, the condensation reaction is catalyzed with 28 ml of N-ethyl piperidine and the mixture is subsequently stirred for 1 h. The organic phase is concentrated by evaporation in an evaporation extruder (ZSK 32) at 330° C.

A eugenol-terminated polycarbonate with a relative solution viscosity of 1.31 (0.5% solution in methylene chloride at 25° C.) is obtained.

Example 2

Production of the MA-grafted polycarbonate (according to the invention)

A mixture of 98% by weight of the polycarbonate of Example 1 and 2% by weight of maleic anhydride is compounded in an extruder (ZSK 32) at 280° C. The polymer obtained has a relative solution viscosity of 1.35.

Example 3

Eugenol-terminated, MA-grafted PC/polyamide blend

A mixture of 80% by weight of the polycarbonate of Example 2 and 20% by weight of polyamide 6 is compounded in an extruder (ZSK 32) at 280° C.

The blend obtained has a breaking elongation of 101%, a tensile modulus (DIN 53455) of 2,600 MPa and a notched impact strength (ISO 180/1A) of 12 kJ/m². It is insoluble in methylene chloride (exposure time 15 minutes).

Example 4

PC/PA/rubber blend

A blend of 70% by weight of the polycarbonate of Example 2 with 20% by weight of polyamide 6 and 10% by weight of an epoxy-functional terpolymer (Lotader AX 8660®, a product of CdF) is compounded an extruder (ZSK 32) at 280° C.

The blend obtained has a breaking elongation of 124%, a tensile modulus of 2,000 MPa and a notched impact strength of 23 kJ/m². It is insoluble in methylene chloride (exposure time 15 minutes).

We claim:

1. Allylphenol-terminated aromatic polycarbonates grafted with 0.2 to 5% by weight, based on 100% by weight of polycarbonate, of maleic anhydride, the polycarbonates having a weight average molecular weight of 10,000 to 200,000 and being based on diphenols of the formula (I):

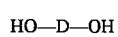

in which D is a $C_{6-50}$ aromatic radical.

2. Polycarbonates as claimed in claim 1 terminated by allylphenols corresponding to formula (II):

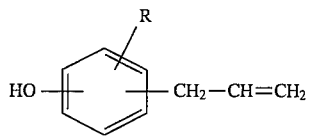

in which R is hydrogen, $C_{1-22}$ alkyl, $C_{6-12}$ cycloalkyl, $C_{6-14}$ aryl or $C_{1-18}$ alkoxy.

3. A process for the production of the polycarbonates claimed in claim 1, characterized in that the grafted allylphenol-terminated aromatic polycarbonates are produced by mixing allylphenol-terminated polycarbonates with maleic anhydride in the melt at temperatures of 220° to 360° C. either in kneaders or in extruders.

4. The polycarbonates of claim 1, prepared by grafting an allylphenol-terminated polycarbonate with maleic anhydride, the allylphenol-terminated polycarbonate being based on units of the formula (I):

HO—D—OH    (I)

in which D is a divalent $C_{6-50}$ aromatic radical.

5. The polycarbonates of claim 4, wherein D is a divalent $C_{12}$ aromatic radical.

6. The polycarbonates of claim 5, wherein the allylphenol-terminated polycarbonates have a weight average molecular weight of 20,000 to 80,000.

7. A polyamide blend comprising a polyamide and allylphenol-terminated aromatic polycarbonates grafted with 0.2 to 5% by weight, based on 100% by weight of polycarbonate, of maleic anhydride, the polycarbonates having a weight average molecular weight of 10,000 to 200,000 and being based on diphenols of the formula (I):

HO—D—OH in which D is a $C_{6-50}$ aromatic radical.

8. A thermoplastic molding compound comprising:
A) 40 to 95% by weight of allylphenol-terminated aromatic polycarbonates grafted with 0.2 to 5% by weight, based on 100% by weight of polycarbonate, of maleic anhydride, the polycarbonates having a weight average molecular weight of 10,000 to 200,000 and being based on diphenols of the formula (I):

HO—D—OH in which D is a $C_{6-50}$ aromatic radical;
B) 5 to 60% by weight of polyamide; and
C) 0 to 20% by weight of epoxy-functional rubber, anhydride-functional rubber, acid-functional rubber, or mixtures thereof;

and optionally additives selected from the group consisting of plasticizers, flow agents, stabilizers, pigments and flame-proofing agents.

* * * * *